(12) United States Patent
Brier

(10) Patent No.: US 8,165,285 B2
(45) Date of Patent: Apr. 24, 2012

(54) PROCESS FOR GENERATING AN ELLIPTIC CURVE, APPLICATION IN A CRYPTOGRAPHIC PROCESS, AND CRYPTOGRAPHIC PROCESS USING SUCH A CURVE

(75) Inventor: Eric Brier, Aubagne (FR)

(73) Assignee: Gemalto SA, Meudon (FR)

( * ) Notice: Subject to any disclaimer, the term of this patent is extended or adjusted under 35 U.S.C. 154(b) by 1245 days.

(21) Appl. No.: 11/336,816

(22) Filed: Jan. 23, 2006

(65) Prior Publication Data

US 2007/0189513 A1 Aug. 16, 2007

(30) Foreign Application Priority Data

Jan. 21, 2005 (FR) ..................................... 05 00671

(51) Int. Cl.
*H04K 1/00* (2006.01)
(52) U.S. Cl. .............. 380/28; 380/277; 380/45; 380/46; 726/14
(58) Field of Classification Search .................... 380/28, 380/46, 47; 726/14
See application file for complete search history.

(56) References Cited

U.S. PATENT DOCUMENTS

| | | | |
|---|---|---|---|
| 6,212,277 B1 * | 4/2001 | Miyaji .............................. | 380/30 |
| 6,212,279 B1 * | 4/2001 | Reiter et al. ................... | 380/278 |
| 6,618,483 B1 * | 9/2003 | Vanstone et al. ................ | 380/30 |
| 6,778,666 B1 * | 8/2004 | Kuzmich et al. ................ | 380/28 |
| 6,816,594 B1 * | 11/2004 | Okeya .............................. | 380/59 |
| 6,952,475 B1 * | 10/2005 | Horn et al. ....................... | 380/30 |
| 7,062,044 B1 * | 6/2006 | Solinas ............................ | 380/30 |
| 7,239,701 B1 * | 7/2007 | Ogishi et al. .................... | 380/44 |
| 7,286,666 B1 * | 10/2007 | Coron .............................. | 380/30 |
| 7,486,789 B2 * | 2/2009 | Futa et al. ........................ | 380/30 |
| 7,539,315 B2 * | 5/2009 | Watanabe et al. ............. | 380/279 |
| 2002/0041683 A1 * | 4/2002 | Hopkins et al. .................. | 380/28 |
| 2003/0208518 A1 * | 11/2003 | Gura et al. ..................... | 708/492 |
| 2005/0135605 A1 * | 6/2005 | Dimitrov et al. ................ | 380/28 |
| 2005/0141720 A1 * | 6/2005 | Watanabe et al. ............. | 380/279 |

OTHER PUBLICATIONS

William Stallings, Cryptography and Network Security, 2003, Pearson Hall, Section 10.3-10.4— pp. 297-308.*
Roberto Avanzi, Multi-Exponentiation in Cryptography, Oct. 8, 2002, pp. 1-22.*
N. Gura, "Generic implementation of elliptical curve cryptography using partial reduction," Sun Microsystems, CCS, Nov. 18-22, 2002, pp. 329-339.*
G.Orlando, "An efficient elliptical curve processor architectures for field programmable logic," Mar. 4, 2002, pp. 13-15, 20-33, 246-256.*

* cited by examiner

*Primary Examiner* — Nathan Flynn
*Assistant Examiner* — Viral Lakhia
(74) *Attorney, Agent, or Firm* — Buchanan, Ingersoll & Rooney PC

(57) ABSTRACT

The invention relates, mainly to a cryptographic process using an elliptic curve represented by means of an equation containing first and second parameters (a, b), a bilinear matching, and calculations in a finite group of integers constructed around at least one first reduction rule reducing each integer to its remainder in a whole division by a first prime number (p) that constitutes a third parameter, the elements of the finite group being in bijection with points selected on the elliptic curve, and the number of which is linked to a fourth parameter (q), where this process uses public and private keys, each of which is represented by a given point of the elliptic curve or by a multiplication factor between two points of this curve.
According to the invention, the first reduction rule is the only reduction rule implemented, and the elliptic curve is obtained through a step-by-step construction process, directly allocating to the finite group q*q q-order points in the elliptic curve.

11 Claims, No Drawings

PROCESS FOR GENERATING AN ELLIPTIC CURVE, APPLICATION IN A CRYPTOGRAPHIC PROCESS, AND CRYPTOGRAPHIC PROCESS USING SUCH A CURVE

BACKGROUND OF THE INVENTION

The invention relates, in general terms, to recent cryptographic techniques and the processes used therein.

More specifically, the invention relates, according to a first -aspect, to a cryptographic process using an elliptic curve represented in a plane by means of an equation containing first and second parameters (a, b), a bilinear matching, and calculations in a finite group of integers constructed around at least one first reduction rule reducing each integer to its remainder in a whole division by a first prime number (p) that constitutes a third parameter, the elements of the finite group being in bijection with points selected on the elliptic curve, and the number of which is linked to a fourth parameter (q), this process using public and private keys, each of which is represented by a given point of the elliptic curve or by a multiplication factor between two points of this curve.

Such processes are the basis for the most recent cryptographical techniques, based on a bilinear pairing, for example a Weil pairing.

A notable example of such a process is provided in the article entitled "Identity-Based Encryption from the Weil Pairing", published in 2003 in the SIAM Journal of Computing, Volume 32, No. 3, pages 586 to 615 by Dan Boneh and Matthew Franklin.

Current processes of this type rely on the use of supersingular elliptic curves.

And yet, the use of such curves implies complex calculations, which may be an obstacle to the use of these processes in all cases in which the available calculation capacities are limited.

DESCRIPTION OF THE INVENTION

In this context, the invention aims to offer an alternative solution that enables the construction of non-supersingular elliptic curves, resulting in a cryptographical process with simplified implementation, although it is also based on a bilinear pairing, for example a Weil pairing.

To this end, the process of the invention, which also conforms to the generic definition given in the preamble above, is essentially characterised in that said first reduction rule is the only reduction rule implemented, and in that the elliptic curve is obtained through a step-by-step construction process, directly allocating to the finite group q*q q-order points in the elliptic curve.

In the case that the cryptographic process at least implements the "SetUp" algorithm from the "Identity Based Encryption" protocol, as defined in the aforementioned article and as known to those skilled in the technique, the step-by-step construction process of said elliptic curve is an integral part of this "SetUp" algorithm.

The invention also relates to a process for generating an elliptic curve represented in a plane by an equation containing first and second parameters (a, b), including calculations in a finite group of integers built on at least one reduction rule that reduces each integer to its remainder in a whole division by a first prime number (p), which constitutes a third parameter, the elements of the finite group being in bijection with points selected on the elliptic curve, and the number of which is linked to a fourth parameter (q), this process being characterised in that it includes operations that consist of the following:

randomly generating a prime number as a fourth parameter (q);

selecting, as a fifth parameter, an integer (d) that complies with the constraints that are inherent in the complex multiplication by numbers with the form $[u+v*\sqrt{-d}]$, where u and v are integers;

randomly generating two extra integers (n, m);

calculating the integer represented by the following sum:

$$1+2 \cdot n \cdot q + q^2 \cdot (n^2 + d \cdot m^2);$$

checking that the previously calculated integer is a prime number; if so, adopting the calculated integer as a third parameter (p); if not, returning to the operation that consists of randomly generating two extra integers (n, m), changing the value of at least one of these two extra integers; and constructing the first and second parameters (a, b) by applying to the third parameter (p) the technique of complex multiplication by $[u+v*\sqrt{-d}]$, where u and v are integers, from which it results that the elliptic curve matches the equation $y^2 = x^3 + a \cdot x + b$, that the finite group includes q*q q-order points in the elliptic curve, and that the first reduction rule is the only reduction rule to be used for constructing the finite group, the calculations thus being simplified.

The fourth parameter (q) is preferably a prime number with at least 160 bits.

It can also be advantageous to provide for the fifth parameter (d) to be an integer equal, at most, to 1000.

In a preferred embodiment of the invention, the fifth parameter (d) is equal to 3, which means that the first parameter (a) is zero.

The process for generating the elliptic curve such as described above is ideally applicable to the execution of the step-by-step construction process of the cryptographic process recalled initially.

Further characteristics and advantages of the invention will appear clearly from the description provided below, for informative purposes and in a non-exhaustive fashion, in reference to its specific application to the "Identity Based Encryption" protocol, also known to those skilled in the technique by the acronym "IBE" and defined in the aforementioned article by Dan Boneh and Matthew Franklin.

The IBE protocol includes, first of all, a so-called "SetUp" algorithm, which allows a trusted body to generate global parameters of the cryptography system and a master key.

The IBE protocol also includes a so-called "Extract" algorithm, which enables a private key to be generated according to the master key and any public key whatsoever.

The fact that any public key whatsoever can be used, allows each user to use, as a public key, a character string that is entirely specific to the user and yet easy to memorise, for example, his/her internet name. Finally, the IBE protocol includes two algorithms that complement each other, marked as "Encrypt" and "Decrypt".

The "Encrypt" algorithm allows the user to obtain an encrypted message from a plain text message through application of the public key, and the "Decrypt" algorithm allows the user to obtain a message in plain text from the encrypted message through application of the private key.

The global parameters of the system include:
an elliptic curve with the equation $y^2 = x^3 + a \cdot x + b$, where a and b constitute the first and second parameters,
a prime number (p) constituting a third parameter, and
another prime number (q) constituting a fourth parameter.

In fact, each of the public and private keys is represented by a given point of the elliptic curve or by a multiplication factor between two points in this curve, such points being in bijection with the elements of a finite group of integers, the number of which is linked with the fourth parameter (q).

The main aim of the invention is to construct the parameters a, b, p, and q in order for the calculations that need to be carried out by the trusted authority and by the users to be as simple as possible.

In the known previous technique, the finite group of integers in which the calculations of the "SetUp" algorithm are performed is constructed according to a first reduction rule that reduces each integer to its remainder in a whole division by the first prime number (p) and to a second reduction rule that involves a polynomial.

In its most generic definition, the invention consists of planning for the first reduction rule to be the only reduction rule implemented, and to obtain the elliptic curve by means of a step-by-step construction process, directly allocating to the finite group q*q q-order points of this elliptic curve.

In the case that the "Identity Based Encryption" protocol is used, the step-by-step construction process of the elliptic curve is then an integral part of the "SetUp" algorithm.

The elliptic curve can, for example, be obtained by implementing the following operations:
1—randomly generating a prime number, this number being intended to constitute the fourth parameter (q);
2—choosing, as a fifth parameter, an integer (d) that complies with the constraints that are inherent in the complex multiplication by numbers with the form [u+v*root(−d)], where u and v are integers;
3—randomly generating two extra integers (n, m);
4—calculating the integer (p0) represented by the following sum:

$$1+2 \cdot n \cdot q + q^2 \cdot (n^2 + d \cdot m^2);$$

5—checking that the previously calculated integer (p0) is a prime number; if so, adopting the calculated integer (p0) as a third parameter (p); if not, returning to the operation that consists of randomly generating two extra integers (n, m) changing the value of at least one of these two extra integers; and
6—constructing the first and second parameters (a, b) by applying to the third parameter (p) the technique of complex multiplication by [u+v*root(−d)], where u and v are integers.

Implementing these operations results in the elliptic curve actually responding to the equation $y^2=x^3+a \cdot x+b$, the finite group comprising q*q q-order points in the elliptic curve, and the first reduction rule being the only reduction rule used for constructing the finite group.

The complex multiplication technique, which should not be confused with the multiplication of two complex numbers, is well known to those skilled in the technique, and notably described in the work: "Blake, I. F., Seroussi, G., and Smart, N. P., *Elliptic Curves in Cryptography*, London Mathematical Society Lecture Notes Series 265, Cambridge University Press, 1999".

The fourth parameter (q) is, for example, a prime number with at least 160 bits; the fifth parameter (d) can be an integer equal to or less than 1000.

In the case of the fifth parameter (d) being equal to 3, the calculations are particularly simplified, since the first parameter (a) becomes zero, the equation of the elliptic curve being reduced to:

$$y^2 = x^3 + b.$$

In this case, the elliptic curve can be obtained by implementing the following operations:
1—randomly generating a prime number, for example with 160 bits, this number being intended to constitute the fourth parameter (q);
2—randomly generating two extra integers (n, m), for example with 352 bits each;
3—calculating the integer (p0) represented by the following sum:

$$1+2 \cdot n \cdot q + q^2 \cdot (n^2 + 3 \cdot m^2);$$

4—checking that the previously calculated integer (p0) is a prime number; if so, adopting the calculated integer (p0) as a third parameter (p); if not, returning to the operation that consists of randomly generating two extra integers (n, m) changing the value of at least one of these two extra integers;
5—randomly selecting an integer b until the order of the elliptic curve with the equation $y^2=x^3+b$ is equal to $q^2 \cdot (n^2+3 \cdot m^2)$, and
6—randomly selecting a point in this curve and performing a scalar multiplication by the integer $(n^2+3 \cdot m^2)$.

The result is a point of the curve, with order q.

Implementation of the process described above provides, for example, the following specific values.

q=4297242806128994185033021941702087560370368619631.

p=2182255977067110242387819202096967372972825015578536888705749107375016847562404710569493286342908191023392532715298934420704578911952747354586206254151906334495679485740755687689682603079627276015128159703948632280242718704092603320805556375189175853222253229327544907801324808853937037680801422832126680386 3367.

The equation of the curve is then $y^2=x^3+8$.

Thanks to the simplification of the calculations to which it leads, the invention facilitates the implementation of a cryptographic process using a bilinear pairing on a chip card equipped with nothing but a crypto-coprocessor designed to perform fast calculations modulo a large number.

The invention claimed is:

1. A process implemented in a crypto-coprocessor, the process using an elliptic curve represented in a plane by means of an equation containing first and second parameters (a, b), a bilinear pairing, and calculations in a finite group of integers constructed around a first reduction rule reducing each integer to a respective remainder in a whole division by a first prime number (p) that constitutes a third parameter, elements of the finite group being in bijection with points selected on the elliptic curve, and a quantity of which is linked to a fourth parameter (q), the process using public and private keys, each of which is represented by a given point of the elliptic curve or by a multiplication factor between two points of the elliptic curve, the process comprising:
randomly generating a prime number as the fourth parameter (q);
selecting, as a fifth parameter, an integer (d) that complies with constraints that are inherent in a complex multiplication with the form [u+v*root(−d)], where u and v are integers;
randomly generating two extra integers (n, m);
calculating an integer based on the fourth parameter (q), the integer (d) and the two extra integers (n, m);
checking whether the calculated integer is a prime number;
based on a result of the checking of the calculated integer, conditionally adopting the calculated integer as the third parameter (p);

constructing the first and second parameters (a, b) by applying to the third parameter (p) a technique of complex multiplication by [u+v*root(−d)]; and obtaining the elliptic curve based on the constructed first and second parameters (a, b).

2. The process according to claim 1, wherein the integer based on the fourth parameter (q), the integer (d) and the two extra integers (n, m) is calculated as follows:

$$1+2 \cdot n \cdot q + q^2 \cdot (n^2 + d \cdot m^2).$$

3. The process according to claim 1, wherein the fourth parameter (q) is a prime number with at least 160 bits.

4. The process for generating an elliptic curve according to claim 1, wherein the fifth parameter (d) is selected to be equal to 3, which results in the first parameter (a) being zero.

5. The process according to claim 1, wherein the elliptic curve matches the equation y^2=x^3+a·x+b.

6. The process according to claim 1, wherein the cryptocoprocessor is included in a chip card.

7. The process according to claim 1, wherein the process is implemented as an integral part of a "SetUp" algorithm from an "Identity Based Encryption" protocol.

8. The process according to claim 1, wherein said first reduction rule is the only reduction rule implemented.

9. The process according to claim 1, further comprising, if the calculated integer is a prime number according to the result of the checking step, adopting the calculated integer as the third parameter (p).

10. The process according to claim 1, further comprising, if the calculated integer is not a prime number according to the result of the checking step, newly generating two random integers to replace the integers (n, m) so that a value of at least one of the two extra integers (n, m) is changed ; and calculating another integer based on the fourth parameter (q); the integer (d) and the replaced integers (n, m).

11. The process according to claim 1, wherein the integer (d) is equal to or less than 1,000.

\* \* \* \* \*